United States Patent [19]

Higuchi

[11] Patent Number: 5,487,310
[45] Date of Patent: Jan. 30, 1996

[54] ELECTROMAGNETIC FLOWMETER

[75] Inventor: Takashi Higuchi, Tokyo, Japan

[73] Assignee: Kabushiki Kaisha Toshiba, Kawasaki, Japan

[21] Appl. No.: 272,230

[22] Filed: Jul. 8, 1994

[30] Foreign Application Priority Data

Jul. 9, 1993 [JP] Japan ..................... 5-170439

[51] Int. Cl.⁶ ..................................... G01F 1/60
[52] U.S. Cl. .................... 73/861.17; 73/861.12; 73/861.16
[58] Field of Search .................. 73/861.17, 861.12, 73/861.16

[56] References Cited

U.S. PATENT DOCUMENTS

| | | | |
|---|---|---|---|
| 4,106,337 | 8/1978 | Trietley, Jr. ........................... | 73/861.16 |
| 4,856,345 | 8/1989 | Mochizuki ........................... | 73/861.17 |
| 5,317,926 | 6/1994 | Okaniwa et al. ..................... | 73/861.17 |

FOREIGN PATENT DOCUMENTS

| | | |
|---|---|---|
| 0294924 | 12/1988 | European Pat. Off. . |
| 57-184922 | 11/1982 | Japan . |
| 61-84107 | 4/1986 | Japan . |
| 2-28807 | 6/1990 | Japan . |

OTHER PUBLICATIONS

Patent Abstracts of Japan, vol. 12, No. 278 (P–738), Aug. 1, 1988, JP-A-63 058 114, Mar. 12, 1988.
Patent Abstracts of Japan, vol. 16, No. 504 (P–1439), Oct. 19, 1992, JP-A-04 184 122, Jul. 1, 1992.
Patent Abstracts of Japan, vol. 17, No. 412 (P–1583), Jul. 30, 1993, JP-A-05 079 873, Mar. 30, 1993.

*Primary Examiner*—Thomas P. Noland
*Assistant Examiner*—Jewel V. Artis
*Attorney, Agent, or Firm*—Oblon, Spivak, McClelland, Maier, & Neustadt

[57] ABSTRACT

An electromagnetic flowmeter of this invention includes a measurement tube for passing a fluid to be measured, alternating magnetic field application means for applying alternating magnetic field and periodically switching magnetic fields applied in a first direction on a plane perpendicular to a direction in which the fluid flows and in a second direction opposite to the first direction, sampling means for sampling electromotive force caused in the fluid by the magnetic fields in the first and second directions by plural times in the same direction in one period, and arithmetic means for deriving the flow rate by the arithmetic process by excluding a sampling value which is contained in the sampling values obtained by the plurality of sampling operations and which exceeds a preset range or replacing the same by a simulated value.

21 Claims, 6 Drawing Sheets

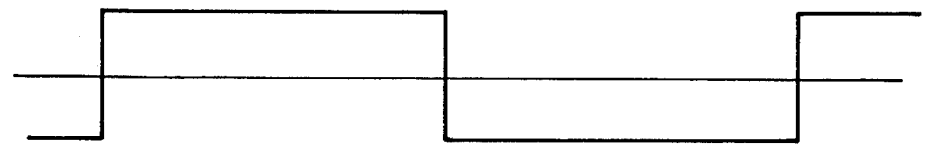
FIG. 3A
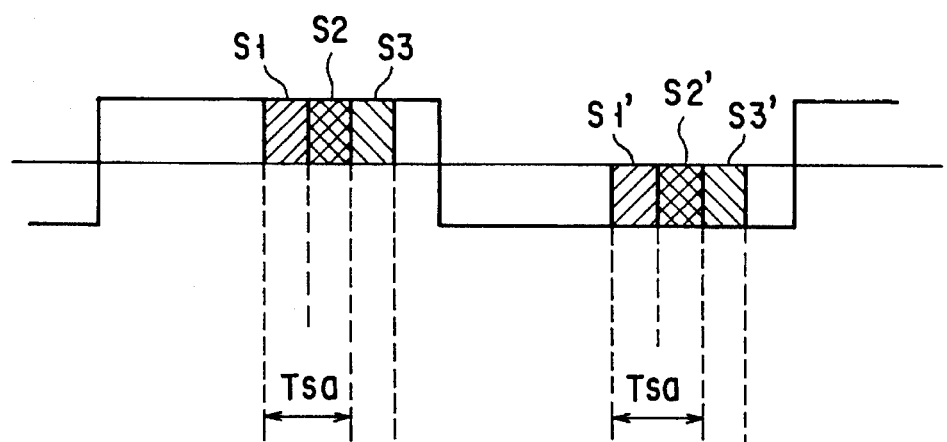
FIG. 3B
FIG. 3C
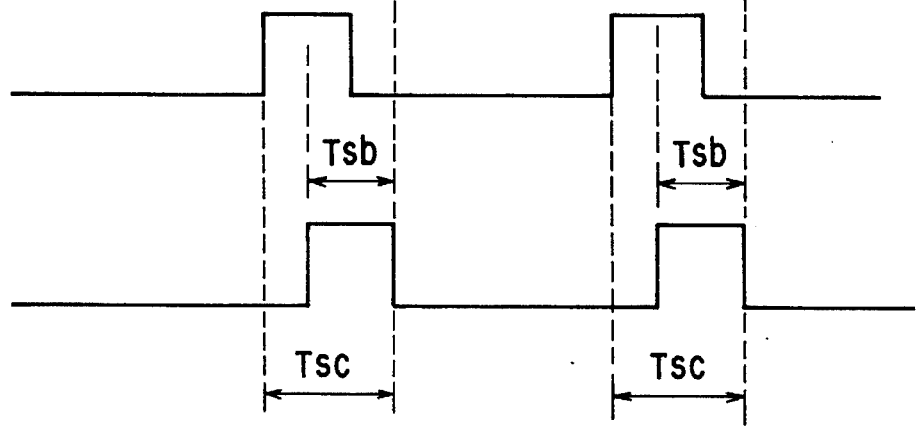
FIG. 3D
FIG. 3E

ELECTROMAGNETIC FLOWMETER

BACKGROUND OF THE INVENTION

1. Field of the Invention

This invention relates to an electromagnetic flowmeter for measuring the flow rate of a fluid such as a conductive fluid, and more particularly to an electromagnetic flowmeter having a noise elimination function of effectively eliminating a spike noise component contained in the flow rate signal, particularly, spike noises occurring at periods close to the excitation period and maintaining the response to the flow rate.

2. Description of the Related Art

FIG. 1 is a schematic diagram showing an example of the construction of a conventional electromagnetic flowmeter.

The electromagnetic flowmeter includes a detector 1 and a converter 11.

The detector 1 includes a measurement tube 2, electrodes 4 mounted on the inner wall of the measurement tube 2, and an exciting coil 3 for applying magnetic flux to the measurement tube 2.

The converter 11 includes an exciting circuit 5 for supplying a current to the exciting coil 3 and periodically switching the direction of the current, an amplifier 6 for amplifying electromotive force (flow rate signal) from the electrodes 4, an A/D converter 7 for sampling an amplified flow rate signal for a preset period of time and converting the same into a digital value, a control circuit 8 for controlling the switching operation of the excitation direction and the sampling timings, an arithmetic circuit 9 for processing the flow rate signal converted in the digital form, and an output circuit 10 for outputting the flow rate signal.

With the above construction, the reason for periodically switching the direction of a current flowing in the exciting coil 3 to apply alternating magnetic flux is that an influence on the flow rate signal given by a DC-like polarization voltage due to the electrochemical action occurring in the electrodes 4 of the detector 1 can be reduced (that is, an influence by the DC noise can be prevented by deriving a difference between flow rate signals sampled in both of the exciting directions).

In the above electromagnetic flowmeter, an indication (output) may become sometimes unstable by a spike noise caused when solid materials in the fluid collide against the electrodes 4.

The fluctuation of indication can be suppressed to some extent by increasing the damping constant and averaging the flow rate signals, but with this method, the response of the electromagnetic flowmeter must be sacrificed, and therefore, its inherent performance cannot be fully exhibited.

In the well known measurement technique, the technique for effecting the arithmetic operation by excluding measurements which exceed a preset range with respect to the input range of a measuring instrument which effects measurements at preset periods or replacing the same by simulated values is considered, but if spike noises occur at periods close to the excitation period, the measurement for each excitation period always receives the influence of the noise and is not effective.

As described above, in the conventional electro-magnetic flowmeter, the response to the flow rate is degraded or it is influenced by the spike noise and the indication (output) thereof becomes unstable.

SUMMARY OF THE INVENTION

An object of this invention is to provide an electromagnetic flowmeter of extremely high reliability having a noise elimination function of effectively eliminating a spike noise component contained in the flow rate signal, particularly, spike noises occurring at periods close to the excitation period and maintaining the response to the flow rate.

The above object can be attained by an electromagnetic flowmeter which comprises a measurement tube for passing a fluid to be measured; alternating magnetic field application means for applying alternating magnetic field and periodically switching magnetic fields applied in a first direction on a plane perpendicular to a direction in which the fluid flows and in a second direction opposite to the first direction; sampling means for sampling an electromotive force caused in the fluid by the magnetic fields in the first and second directions by plural times in the same direction in one period; and arithmetic means for deriving the flow rate by the arithmetic process by excluding a sampling value which is contained in the sampling values obtained by the plurality of sampling operations and which exceeds a preset range or replacing the same by a simulated value. In the electromagnetic flowmeter, the arithmetic means includes means for excluding a sampling value $Si$ which is contained in a plurality of sampling values $Sn$ ($n=1$ to $N$) sampled in at least one of the first and second directions and which exceeds the preset range or replacing the same by a simulated value with values $S(i-1)$ and $S(i+1)$ sampled before and after the sampling value $Si$ used as a reference. Particularly, the arithmetic means includes means for excluding the sampling value which is contained in a plurality of sampling values $Sn$ ($n=1$ to $N$) sampled in at least one of the first and second directions and which exceeds the preset range or replacing the same by a simulated value. Further, in the electromagnetic flowmeter, the arithmetic means includes means for excluding the sampling value which is contained in a plurality of sampling values $Sn$ ($n=1$ to $N$) sampled in at least one of the first and second directions and which exceeds the preset range or replacing the same by a simulated value with an average value $$\sum_{n=1}^{N} Sn/N$$

of the sampling values used as a reference.

Further, the arithmetic means includes means for excluding a sampling value $Si$ which is contained in a plurality of sampling values $Sn$ ($n=1$ to $N$) sampled in at least one of the first and second directions and which exceeds a preset range or replacing the same by a simulated value with an average value $$\left( \sum_{n=1}^{i-1} Sn + \sum_{n=i+1}^{N} Sn \right)/(N-1)$$

of the sampling values except the sampling value $Si$ used as a reference.

Further, the arithmetic means includes means for excluding or replacing a sampling value by a simulated value when a difference between the sampling value and a value sampled at the same timing in the opposite phase exceeds a preset range.

In the electromagnetic flowmeter of this invention, the operation for sampling a flow rate signal in the direction of magnetic flux is effected plural times, and if a sampling value which is extremely small or large in comparison with the other sampling values (and which has a difference exceeding a preset range with respect to a value sampled at the same timing in the opposite phase) is contained in the sampling values, the sampling value is excluded or replaced by a simulated value and then the arithmetic operation is effected.

The spike noise component contained in the flow rate signal, particularly, spike noises occurring at periods close to the exciting period, can be effectively removed. The response to the flow rate will not be degraded. Thus, an electromagnetic flowmeter of extremely high reliability having a noise eliminating function can be provided.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 3A to 3E are diagrams showing the timing charts of an excitation signal, flow rate signal and counter control signal in the electromagnetic flowmeter of this embodiment;

DETAILED DESCRIPTION OF THE PREFERRED EMBODIMENTS

The important point of this invention is that the operation of sampling a flow rate signal in the same phase in one period is effected plural times in an electromagnetic flowmeter having the exciting system by the alternating magnetic flux, and if a sampling value which is extremely small or large (that is, if it exceeds a preset range) is contained in the sampling values, the sampling value is excluded or replaced by a simulated value and then the arithmetic operation is effected. In this case, the condition that the sampling value exceeds the preset range includes a case wherein the sampling value has a difference exceeding a preset range with respect to a value sampled at the same timing in a phase obtained by inverting a phase in the opposite phase in the same period.

There will now be described an embodiment of this invention based on the above concept in detail with reference to the accompanying drawings.

Figure 1:
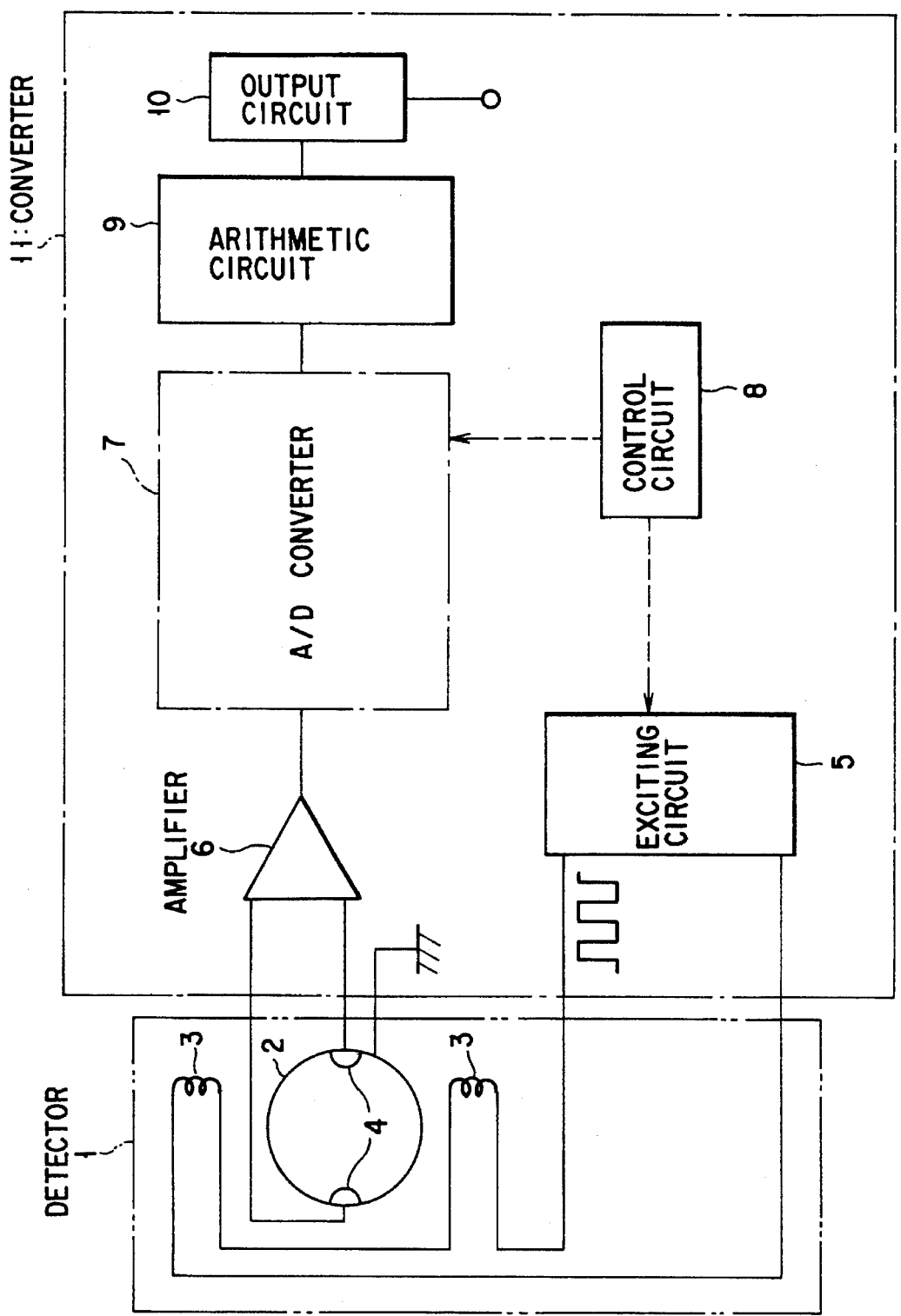
FIG. 1 is a schematic diagram showing an example of the construction of a conventional electromagnetic flowmeter.
Figure 2:
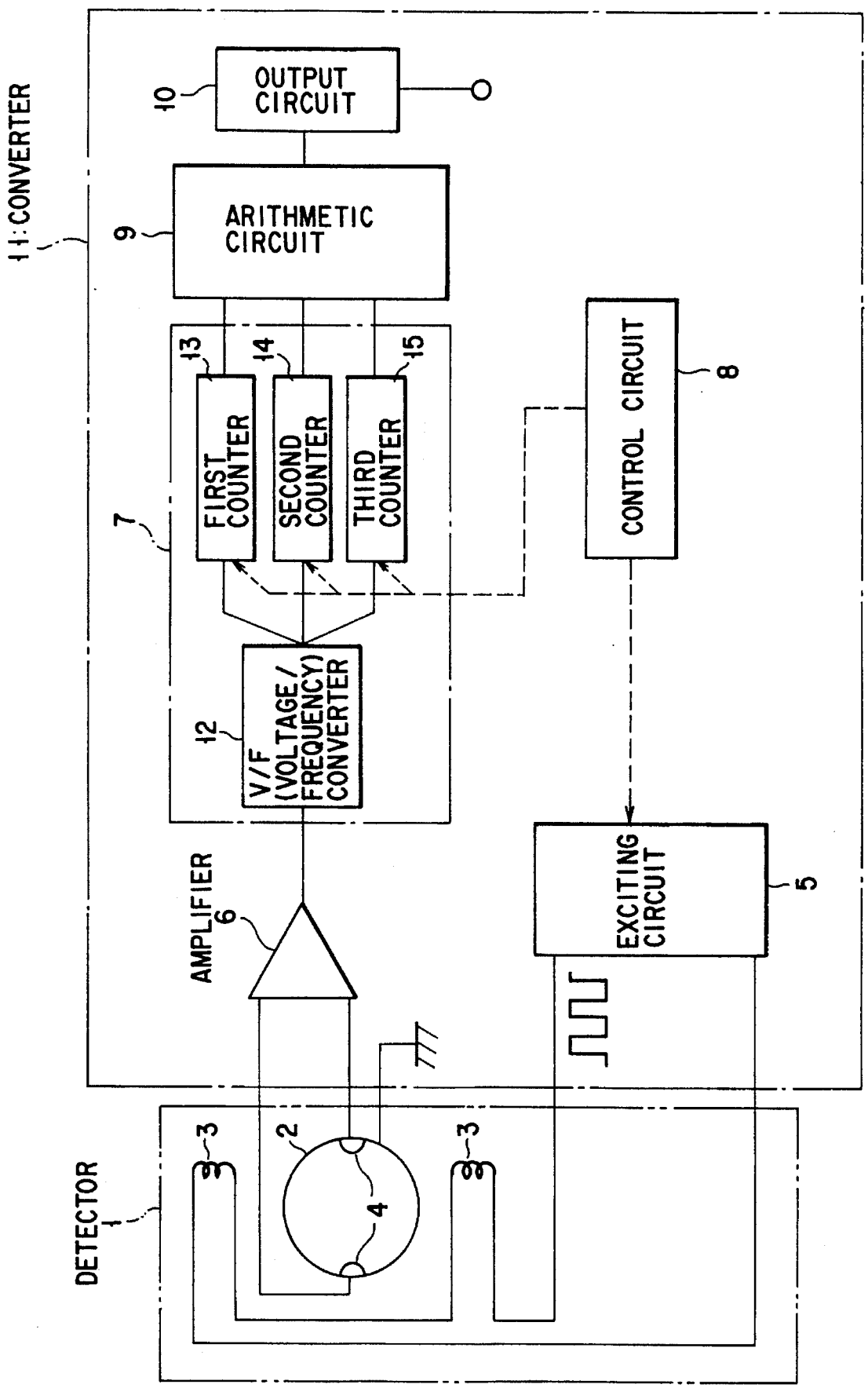
FIG. 2 is a schematic diagram showing one embodiment of an electromagnetic flowmeter according to this invention.
Figure 4A:
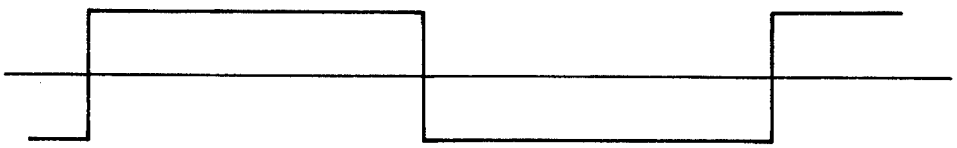
FIGS. 4A to 4E are diagrams showing the timing charts of an excitation signal, flow rate signal and counter control signal in the electromagnetic flowmeter of this embodiment.
Figure 4B:
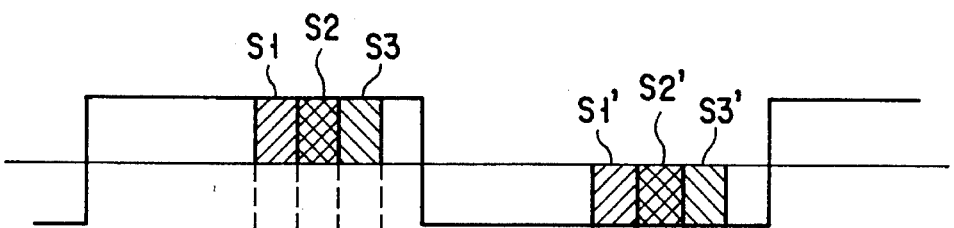
Figure 4C:
Figure 4D:
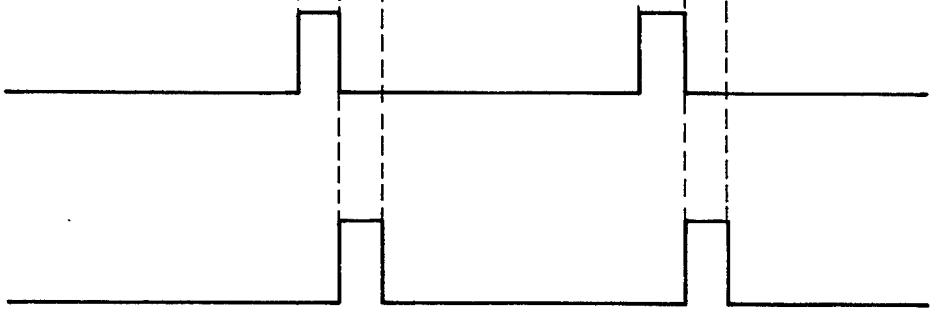
Figure 4E:

FIG. 2 is a schematic diagram showing an example of the construction of an electromagnetic flowmeter according to this invention and portions of FIG. 2 which are the same as those of the conventional case shown in FIG. 1 are denoted by the same reference numerals. In the embodiment described below, the number of sampling operations effected in the same phase in one period is set to 3 for convenience of explanation, but this is not limitative and the number of sampling operations effected in the same phase in one period can be adequately determined.

The electromagnetic flowmeter of this embodiment includes a detector 1 and a converter 11.

The detector 1 includes electrodes 4 mounted on the inner wall of a measurement tube 2 for passing a fluid, and an exciting coil 3 for applying magnetic flux to the measurement tube 2.

The converter 11 includes an exciting circuit 5 for supplying a current to the exciting coil 3 and periodically switching the direction of the current, an amplifier 6 for amplifying electromotive force (flow rate signal) from the electrodes 4, an A/D converter 7 for sampling an amplified flow rate signal for a preset period of time and converting the same into a digital value, a control circuit 8 for controlling the switching operation of the excitation direction and the sampling timings, an arithmetic circuit 9 for processing the flow rate signal converted in the digital form, and an output circuit 10 for outputting the flow rate signal.

The A/D converter 7 includes a V/F (voltage/frequency) converter 12 for converting a voltage level into a pulse frequency, and first to third counters 13 to 15 for counting an output pulse from the V/F converter 12.

The control circuit 8 controls the first to third counters 13 to 15 at different timings so that the first to third counters 13 to 15 may output A/D converted values (accumulated values) of the flow rate signal at different timings with different sampling times.

The operation of this embodiment with the above construction is explained with reference to FIGS. 3A to 6E.

FIGS. 3A to 3E are timing charts showing an example of an excitation signal, flow rate signal and control signals of the first to third counters, that is, control signals for the sampling time.

While the counter control signal from the control circuit 8 is kept at the "H" level, the gates of the counters 13 to 15 are opened and an output pulse of the V/F converter 12 is counted.

In FIGS. 3A to 3E, the relation between sampling times Tsa, Tsb, Tsc in the same phase in one period is set such that $Tsa=Tsb=(2/3) \times Tsc$. If sampling values at timings of the respective sampling times are respectively set to Sa, Sb, Sc, sampling values S1, S2, S3 at different sampling timings with the same sampling time can be respectively derived by $S1=Sc-Sb$, $S2=Sa+Sb-Sc$, and $S3=Sc-Sa$.

In this case, a sampling control method as shown in FIGS. 4A to 4E can be used, but the A/D conversion with higher resolution can be attained by lengthening the sampling time of one cycle by use of the sampling method shown in FIGS. 3A to 3E.

In this case, the arithmetic operation effected by using one sampling value Sc with the same phase in one period is the same as the conventional arithmetic operation.

Sampling values S1' to S3' in FIGS. 3A to 3E and FIGS. 4A to 4E indicate sampling values at timings corresponding to S1 to S3 in the opposite phase in the same period.

Figure 5:
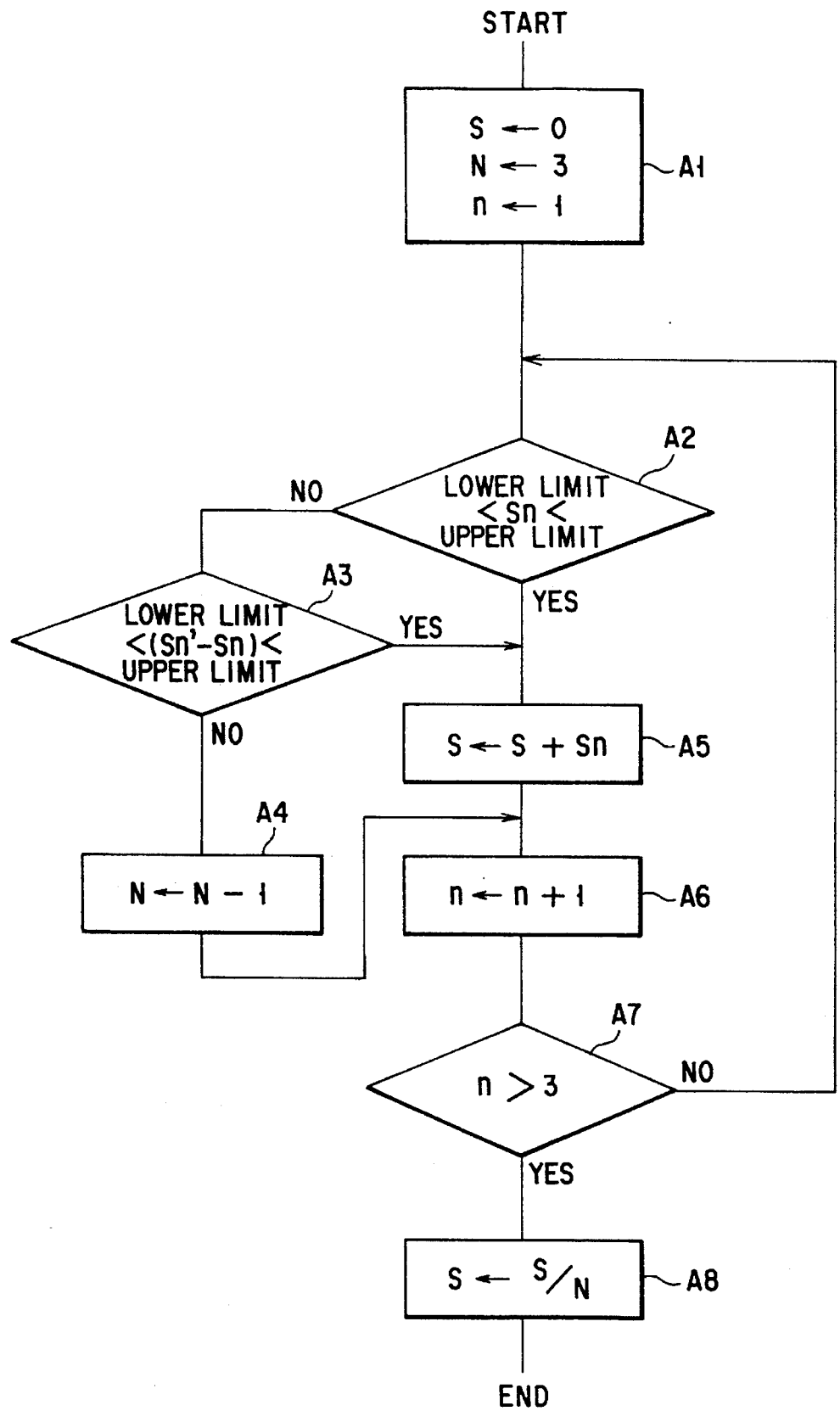
FIG. 5 is a flowchart showing one example of the signal processing routine in this embodiment.

FIG. 5 is a flowchart showing the processing routine for the three sampling values S1 to S3 in the same phase in one period obtained in the device of this embodiment.

A sampling value variable S, counter value n, and the sampling number (3 in this embodiment) in the same phase of one period are set to respective initial values (step A1).

Whether the first sampling value S1 lies within a preset range or not is checked (step A2). In the step A2, if it is detected that the sampling value S1 lies outside the preset range, whether a difference from a sampling value S1' obtained at a timing corresponding to the sampling value S1 in the opposite phase in the same period lies within a preset range or not is checked (step A3).

In the step A3, if it is detected that a difference from the sampling value S1' obtained at a timing corresponding to the sampling value S1 in the opposite phase in the same period lies within the preset range, the sampling value S1 is determined to be inadequate and is excluded. In this case, the sampling number is reduced from N=3 to N=2 (step A4).

If it is detected in the step A2 that the sampling value S1 lies within the preset range, or if it is detected in the step A3 that a difference from a sampling value S1' obtained at a timing corresponding to the sampling value S1 in the opposite phase in the same period (which may be referred to as the same timing in the opposite phase) lies within the preset range, the sampling value S1 is added to the sampling value variable S (step A5).

Next, the counter value n is incremented by one in order to check the validity of the sampling value S2 (A6).

If the counter value n exceeds 3 (step A7), no sampling data is present, and therefore, the sampling value variable S is divided by the sampling number N to derive an average value of the sampling values (step A8). If the counter value n is not larger than 3, sampling data is still present, and therefore, the process starting from the step A2 is repeatedly effected (step A7).

Figure 6A:
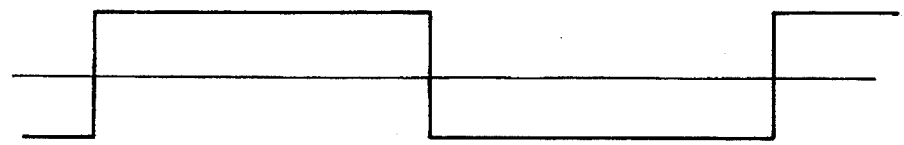
FIGS. 6A to 6E are diagrams showing the timing charts of an excitation signal, flow rate signal and counter control signal in the electromagnetic flowmeter of this embodiment (an example in which noise is superposed on the flow rate signal).
Figure 6B:
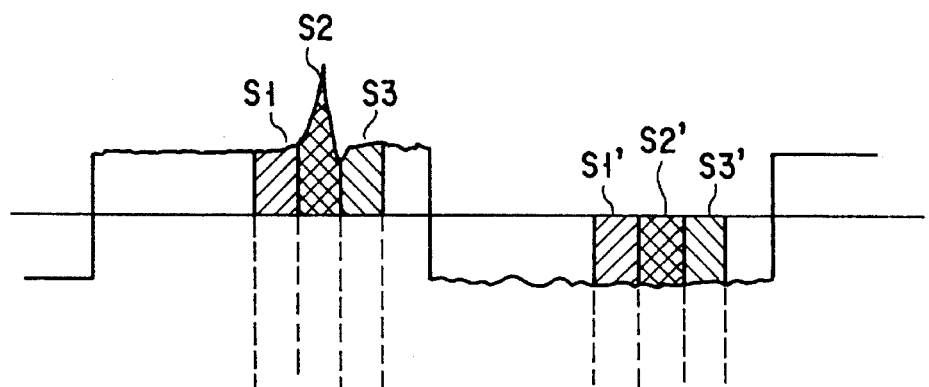
Figure 6C:
Figure 6D:
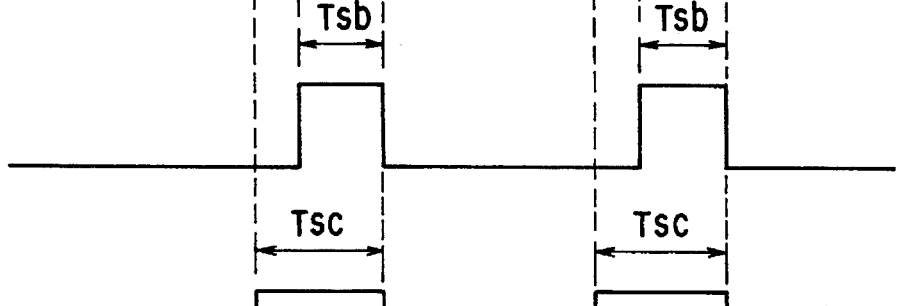
Figure 6E:

By the operation described above, influence by the noise is given since the flow rate of a fluid is derived by use of only the sampling value (accumulated value of the counter C) in the period Tsc shown in FIG. 6E in the conventional case if the noise (for example, the sampling value S2) is superposed on a flow rate signal as shown in FIGS. 6A to 6E. However, in this embodiment, since the sampling values S1, S2 and S3 are first separately derived, it becomes possible to exclude the sampling value S2 containing the noise and effect the arithmetic operation by use of only the remaining sampling values S1 and S3, and thus the output value can be made free from the influence by the noise.

If an abnormal value is excluded based simply on the comparison of the sampling values S1, S2, S3, a sampling value which is made extremely large by noise of the same phase generated at the time of switching of the excitation direction will be treated as a value to be excluded and it is not used for any arithmetic operation, thereby making it impossible to obtain a correct measurement. In this embodiment, since the operation for determining that the sampling value is excluded only when a difference from the sampling value in the opposite phase corresponding to the sampling value in the same period is larger than the preset value is effected in addition to the above-described operation, the above problem will not occur.

In the description of the step A4, the sampling value Sn is determined to be inadequate and is excluded when the sampling value Sn is detected to be outside the preset range in the step A2 and a difference from the sampling value Sn' obtained at the same timing in the opposite phase is detected to be outside the preset range in the step A3, but this is not limitative, and the sampling value Sn can be replaced by a simulated value such as an average value obtained in the step A8.

As described above, the device of this invention includes the detector 1 and the converter 11, the detector 1 includes the measurement tube 2 for passing the fluid, the electrodes 4 mounted on the inner wall of the measurement tube 2, and the exciting coil 3 for applying magnetic flux to the measurement tube 2, and the converter 11 includes the exciting circuit 5 for supplying a current to the exciting coil 3 and periodically switching the direction of the current, the amplifier 6 for amplifying electromotive force (flow rate signal) from the electrodes 4, the A/D converter 7 for sampling an amplified flow rate signal for a preset period of time and converting the same into a digital value, the control circuit 8 for controlling the switching operation of the excitation direction and the sampling timings, the arithmetic circuit 9 for processing the flow rate signal converted in the digital form, and the output circuit 10 for outputting the flow rate signal. With this construction, the flow rate can be derived by sampling electromotive force (flow rate signal) generated in the fluid in the respective magnetic flux directions according to the Faraday's law via the electrodes 4 mounted on the measurement tube 2 and subjecting the sampled values to the arithmetic operation.

In the device of this invention, the A/D converter 7 includes the V/F converter 12 for converting a voltage level into a pulse frequency, and first to third counters 13 to 15 for counting an output pulse from the V/F converter 12, the first to third counters 13 to 15 are controlled by the control circuit 8 at different timings so that the first to third counters 13 to 15 may output A/D converted values (accumulated values) of the flow rate signal at different timings with different sampling times, thus effecting the operation of sampling the flow rate signal in a magnetic flux direction plural times. If a sampling value which exceeds a limited range and has a difference exceeding a preset range with respect to a value sampled at the same timing in the opposite phase is contained in the sampling values Sn (n=1 to N) obtained in a plurality of sampling operations, the sampling value is excluded or replaced by a simulated value and then the arithmetic operation is effected.

In this case, the "limited range" may be a fixed value or may be set to a range which is equal to, for example, two or three times a variance value or standard deviation value derived based on data. Further, the "simulated value" is an arithmetical mean value of the sampling values, for example.

As described above, according to this invention, it is possible to effect the process without using the sampling value containing low-frequency noise in the arithmetic operation (that is, eliminate the influence by spike noise at the conventional excitation frequency without degrading the response since values which exceed the range of the ability of the A/D converter and the sampling circuit of the converter are not reflected on the arithmetic operation).

Therefore, since the sampling value containing the noise component is not reflected on the arithmetic operation from the beginning, the influence by the noise can be effectively eliminated even if the process based on an average value over a long time or large damping constant is not effected.

If a sampling value which is extremely large is simply excluded, a sampling value which is made extremely large by noise of the same phase generated at the time of switching of the excitation direction will be treated as a value to be excluded and it is not used for any arithmetic operation, thereby making it impossible to obtain a correct measurement. However, in this embodiment, a sampling value is compared with the sampling value at the same timing in the opposite phase and the sampling value is treated as a to-be-excluded value only when a difference between the compared sampling values is large, and thus the above problem will not occur.

As described above, the spike noise component contained in the flow rate signal, particularly, spike noises occurring at periods close to the exciting period, can be effectively removed and the response to the flow rate will not be degraded.

This invention is not limited to the above embodiment. This invention can be embodied in the same manner as will be described below.

(a) In the above embodiment, a method for excluding a value which is contained in the sampling values Sn (n=1 to N) obtained in a plurality of sampling operations in a direction of magnetic flux, which exceeds a preset range and which has a difference exceeding a preset range with respect to a value sampled at the same timing in the opposite phase, or replacing the same by a simulated value and then effecting the arithmetic operation, is explained as a method for effecting the operation for sampling a flow rate signal in a direction of magnetic flux plural times, excluding or replacing the sampling value by a simulated value and then effecting the arithmetic operation if the sampling value which is extremely small or large is contained in the sampling values. This invention is not limited to this method, and an arithmetic method for making the noise component for the original flow rate signal significant and then excluding the noise component may be used, for example.

More specifically, even if a value is excluded or replaced by a simulated value and the arithmetic operation is effected when the value exceeds a preset range with the average value $$\sum_{n=1}^{N} Sn/N$$

of a plurality of sampling values Sn (n=1 to N) in a preset magnetic flux direction in one period used as a reference, substantially the same effect as in the former embodiment can be attained. In this case, like the former embodiment, it is possible to set a limitation that a difference between the sampling value Sn and a value sampled at the same timing in the opposite phase exceeds a preset range.

(b) As the arithmetic method for effectively effecting the arithmetic operation by the arithmetic method of (a), a sampling value Si may be excluded or replaced by a simulated value and the arithmetic operation may be effected when the sampling value Si exceeds a preset range by using the average value $$\left( \sum_{n=1}^{i-1} Sn + \sum_{n=i+1}^{N} Sn \right) /(N-1)$$

of those of a plurality of sampling values Sn (n=1 to N) sampled in the preset magnetic flux direction which do not contain the sampling value Si as a reference. In this case, like the former embodiment, it is possible to set a limitation that a difference between the sampling value Sn and a value sampled at the same timing in the opposite phase exceeds a preset range.

(c) In the former embodiment, there is explained a case wherein a sampling value is excluded or replaced by a simulated value when the sampling value which exceeds a preset range is contained in the sampling values Sn (n=1 to N) in the method for effecting the operation of sampling a flow rate signal in a preset magnetic flux direction plural times in one period, excluding or replacing a sampling value by a simulated value and then effecting the arithmetic operation if the sampling value which is extremely small or large is contained in the sampling values, but this is not limitative, and the arithmetic method for removing unexpected noise by comparing the preceding and succeeding sampling values, for example, can be used.

That is, specifically, even if a sampling value Si is excluded or replaced by a simulated value and the arithmetic operation is effected when the sampling value Si among a plurality of sampling values Sn (n=1 to N) sampled in the preset magnetic flux direction exceeds a control range with values S(i−1) and S(i+1) sampled before and after the value Si used as a reference, substantially the same effect as in the former embodiment can be attained. In this case, like the former embodiment, it is possible to set a limitation that a difference between the sampling value Sn and a value sampled at the same timing in the opposite phase exceeds a preset range.

Further, in the above explanation of the former embodiment, the treatment of sampling values in one period is explained, but the sampling values obtained in the preceding period or periods may be used to determine the reference value.

This invention can be variously modified without departing from the technical scope thereof.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electromagnetic flowmeter comprising:
   a measurement tube for passing a fluid to be measured;
   alternating magnetic field application means for applying alternating magnetic field and periodically switching magnetic fields applied in a first direction on a plane perpendicular to a direction in which the fluid flows and in a second direction opposite to the first direction;
   sampling means for sampling electromotive force caused in the fluid by the magnetic fields in the first and second directions by plural times in the same direction in one period; and
   arithmetic means for deriving the flow rate by the arithmetic process by excluding a sampling value which is contained in the sampling values obtained by the plurality of sampling operations and which exceeds a preset range or replacing the same by a simulated value.

2. An electromagnetic flowmeter according to claim 1, wherein said simulated value includes an average of the sampling values sampled in the same magnetic field direction.

3. An electromagnetic flowmeter according to claim 1, wherein said arithmetic means includes means for excluding or replacing a sampling value by a simulated value when a difference between the sampling value and a value sampled at the same timing in the opposite phase exceeds a preset range.

4. An electromagnetic flowmeter according to claim 3, wherein said simulated value includes an average of the sampling values sampled in the same magnetic field direction.

5. An electromagnetic flowmeter according to claim 1, wherein said arithmetic means includes means for excluding a sampling value which is contained in a plurality of sampling values Sn (n=1 to N) sampled in at least one of the first and second directions and which exceeds the preset range or replacing the same by a simulated value.

6. An electromagnetic flowmeter according to claim 5, wherein said simulated value includes an average of the sampling values sampled in the same magnetic field direction.

7. An electromagnetic flowmeter according to claim 5, wherein said arithmetic means includes means for excluding or replacing a sampling value by a simulated value when a difference between the sampling value and a value sampled at the same timing in the opposite phase exceeds a preset range.

8. An electromagnetic flowmeter according to claim 7, wherein said simulated value includes an average of the sampling values sampled in the same magnetic field direction.

9. An electromagnetic flowmeter according to claim 1, wherein said arithmetic means includes means for excluding a sampling value which is contained in a plurality of sampling values Sn (n=1 to N) sampled in at least one of the first and second directions and which exceeds the preset range or replacing the same by a simulated value with an average value $$\sum_{n=1}^{N} Sn/N$$

of the sampling values used as a reference.

10. An electromagnetic flowmeter according to claim 9, wherein said simulated value includes an average of the sampling values sampled in the same magnetic field direction.

11. An electromagnetic flowmeter according to claim 9, wherein said arithmetic means includes means for excluding or replacing a sampling value by a simulated value when a difference between the sampling value and a value sampled at the same timing in the opposite phase exceeds a preset range.

12. An electromagnetic flowmeter according to claim 11, wherein said simulated value includes an average of the sampling values sampled in the same magnetic field direction.

13. An electromagnetic flowmeter according to claim 1, wherein said arithmetic means includes means for excluding a sampling value Si which is contained in a plurality of sampling values Sn (n=1 to N) sampled in at least one of the first and second directions and which exceeds a preset range or replacing the same by a simulated value with an average value $$\left( \sum_{n=1}^{i-1} Sn + \sum_{n=i+1}^{N} Sn \right) /(N-1)$$

of the sampling values except the sampling value Si used as a reference.

14. An electromagnetic flowmeter according to claim 13, wherein said simulated value includes an average of the sampling values sampled in the same magnetic field direction.

15. An electromagnetic flowmeter according to claim 13, wherein said arithmetic means includes means for excluding or replacing a sampling value by a simulated value when a difference between the sampling value and a value sampled at the same timing in the opposite phase exceeds a preset range.

16. An electromagnetic flowmeter according to claim 15, wherein said simulated value includes an average of the sampling values sampled in the same magnetic field direction.

17. An electromagnetic flowmeter according to claim 1, wherein said arithmetic means includes means for excluding a sampling value Si which is contained in a plurality of sampling values Sn (n=1 to N) sampled in at least one of the first and second directions and which exceeds the preset range or replacing the same by a simulated value with values S(i−1) and S(i+1) sampled before and after the sampling value Si used as a reference.

18. An electromagnetic flowmeter according to claim 17, wherein said simulated value includes an average of the sampling values sampled in the same magnetic field direction.

19. An electromagnetic flowmeter according to claim 17, wherein said arithmetic means includes means for excluding or replacing a sampling value by a simulated value when a difference between the sampling value and a value sampled at the same timing in the opposite phase exceeds a preset range.

20. An electromagnetic flowmeter according to claim 19, wherein said simulated value includes an average of the sampling values sampled in the same magnetic field direction.

21. A flow rate measuring method comprising the steps of:
applying alternating magnetic field and periodically switching magnetic fields applied in a first direction on a plane perpendicular to a direction in which the fluid flows and in a second direction opposite to the first direction;

sampling electromotive force caused in the fluid by the magnetic fields in the first and second directions by plural times in the same direction in one period; and deriving the flow rate by the arithmetic process by excluding a sampling value which is contained in the sampling values obtained by the plurality of sampling operations and which exceeds a preset range or replacing the same by a simulated value.

* * * * *